United States Patent [19]

Lillington et al.

[11] Patent Number: 5,798,591
[45] Date of Patent: Aug. 25, 1998

[54] ELECTROMAGNETIC MACHINE WITH PERMANENT MAGNET ROTOR

[75] Inventors: Paul Evan Lillington, Lugarno; David John Lillington, Sylvania, both of Australia

[73] Assignee: T-Flux Pty Limited, Peakhurst, Australia

[21] Appl. No.: 592,324

[22] PCT Filed: Jul. 19, 1994

[86] PCT No.: PCT/AU94/00405

§ 371 Date: Jan. 18, 1996

§ 102(e) Date: Jan. 18, 1996

[87] PCT Pub. No.: WO95/03646

PCT Pub. Date: Feb. 2, 1995

[30] Foreign Application Priority Data

Jul. 19, 1993 [AU] Australia ................. PM0011

[51] Int. Cl.⁶ ................. H02K 29/08; H02K 37/00
[52] U.S. Cl. ................. 310/164; 310/49 R; 310/254
[58] Field of Search ................. 310/164, 156, 310/268, 49 R, 264, 254, 258, 68 R

[56] References Cited

U.S. PATENT DOCUMENTS

| | | | |
|---|---|---|---|
| 2,623,187 | 12/1952 | Adams | 310/154 |
| 3,330,975 | 7/1967 | Osterwalder | 310/164 |
| 3,665,227 | 5/1972 | Busch | 310/46 |
| 3,678,311 | 7/1972 | Mattingly | 310/156 |
| 3,798,526 | 3/1974 | Takahashi et al. | 318/696 |
| 3,922,573 | 11/1975 | Whiteley | 310/156 |
| 4,141,210 | 2/1979 | Flaig | 58/23 D |
| 4,207,483 | 6/1980 | Baer | 310/49 R |
| 4,417,167 | 11/1983 | Ishii et al. | 310/67 R |
| 4,626,698 | 12/1986 | Harnden, Jr. et al. | 307/38 |
| 4,704,566 | 11/1987 | Hirano et al. | 318/254 |
| 4,731,554 | 3/1988 | Hall et al. | 310/67 R |
| 4,794,293 | 12/1988 | Fujisaki et al. | 310/268 |
| 4,841,189 | 6/1989 | Cooper | 310/257 |
| 4,922,145 | 5/1990 | Shtipelman | 310/49 R |
| 5,051,641 | 9/1991 | Weh | 310/163 |
| 5,101,131 | 3/1992 | Ushiro et al. | 310/258 |
| 5,107,159 | 4/1992 | Kordik | 310/156 |
| 5,148,069 | 9/1992 | Nonaka et al. | 310/68 R |
| 5,214,337 | 5/1993 | Ishibashi | 310/268 |
| 5,386,166 | 1/1995 | Reimer et al. | 310/90.5 |

FOREIGN PATENT DOCUMENTS

| | | |
|---|---|---|
| 2 570 228 | 9/1984 | France . |
| 37 05 089 A1 | 2/1987 | Germany . |
| 60-59954 | 4/1985 | Japan . |
| 60-59955 | 4/1985 | Japan . |
| 62-193547 | 8/1987 | Japan . |
| 62-221859 | 9/1987 | Japan . |
| 63-129853 | 6/1988 | Japan . |
| 1-138940 | 5/1989 | Japan . |
| 1241-350 | 6/1986 | U.S.S.R. . |

*Primary Examiner*—Steven L. Stephan
*Assistant Examiner*—Tran N. Nguyen
*Attorney, Agent, or Firm*—David P. Gordon; David S. Jacobson; Thomas A. Gallagher

[57] ABSTRACT

A motor or alternator comprises a number of permanent magnets (34, 36) arranged about the periphery of a rotor (30). The magnets (34, 36) are encompassed by stator coils (44) pressed over and supported on the stator housing (41) between fins (39). The magnets (34, 36) are arranged with their like poles facing each other while the stator coils (44) are arranged in a C-shape or a U-shape configuration about the permanent magnets allowing the magnets (34, 36) to rotate within the toroidal space defined by the stator coils (44). The rotor (30) is made of a non-magnetic material which may include an electrical conductor such as aluminum or a highly resistive material such as a plastics material. The number of stator coils (44) will depend on the phase excitation used (a 3-phase motor is described) with the commutation of the coils being supplied either mechanically or electronically. In the latter case rotor position is sensed by vanes (61) of a shutter housing (60), rotating with the shaft (42), interrupting light from the diode (64) to the photoelectric detector (62). Other embodiments may employ Hall effect sensors, or the stator coils (44) and the magnets (34, 36) may be located at an inner radius of the rotor, the rotor then being annular in form, or to one or more of the sides of a discoid rotor.

20 Claims, 9 Drawing Sheets

1

ELECTROMAGNETIC MACHINE WITH PERMANENT MAGNET ROTOR

FIELD OF THE INVENTION

This invention relates to a motor or generator, in particular of a permanent magnet type, in which the rotor has magnetic poles with their polar axes arranged tangentially about the direction of rotation of the rotor and the stator coils enclose said poles.

BACKGROUND OF THE INVENTION

In the prior art, electromagnetic motors or generators are normally provided with a radial orientation of the magnetic fields of the stator and rotor. In addition the magnetic flux circuit of either the stator or rotor is enhanced by using a material having a high magnetic permeability. In such motors or generators there is energy loss due to eddy currents generated in this magnetic material, traditionally overcome by using laminations of the magnetic material.

Also the magnetic material has hysteresis losses and saturation of the iron circuit can occur at points within the magnetic circuit.

In addition, electromechanical devices employing a magnetic circuit normally have a disadvantage in weight since the known magnetic materials such as iron, nickel, or cobalt used in these devices are heavy, in addition to the problems stated above of any eddy current or hysteresis losses.

SUMMARY OF THE INVENTION

The present invention seeks to overcome some of these disadvantages in prior art machines or at least to ameliorate them, or to provide an alternative thereto.

According to a broad aspect of the invention there is provided an electromagnetic device of the type having a stator and a rotor, said rotor having a plurality of magnetic poles arranged about a radius of said rotor with their polar axes tangential to the said radius and said stator is an arrangement of stator coils in an open toroidal configuration enclosing said magnetic poles of said rotor.

The toroidal configuration of the stator coils is preferably of a C- or U-shape with the gap in the stator coil structure allowing the magnets of the rotor to be accommodated in the general torus thereby provided. Preferably, the magnetic poles are provided by permanent magnets which are arranged with like poles opposed.

The rotor may be made with no magnetic material, for example of a plastics material, or may be made of a conductive material such as aluminium or stainless steel. The permanent magnets may be embedded in or otherwise affixed to the rotor at the given radius from the centre of rotation of the rotor, for example at the periphery of the rotor, or may be positioned inwardly of the desired radial position with a magnetic or flux circuit conveying the magnetic field to the desired region, for example at the periphery, so that the magnetic poles of the rotor are within the toroidal space defined by the stator, preferably including the area of maximum field intensity of the stator coils.

The stator coils are made up of saddle shaped windings and are supported on a non-magnetic housing, for example, of a plastics material.

BRIEF DESCRIPTION OF THE DRAWINGS

Preferred embodiments of the invention will now be described with respect to the following figures in which.

PREFERRED MODES FOR PERFORMING THE INVENTION

While the description and the embodiments to follow are of the operation of a motor and are described with respect to a prescribed number of magnetic poles and phases, the invention is not limited to any specific number of magnetic poles or phases, nor a motor per se and the description herein is to be understood as not limiting in that respect.

Figure 7:
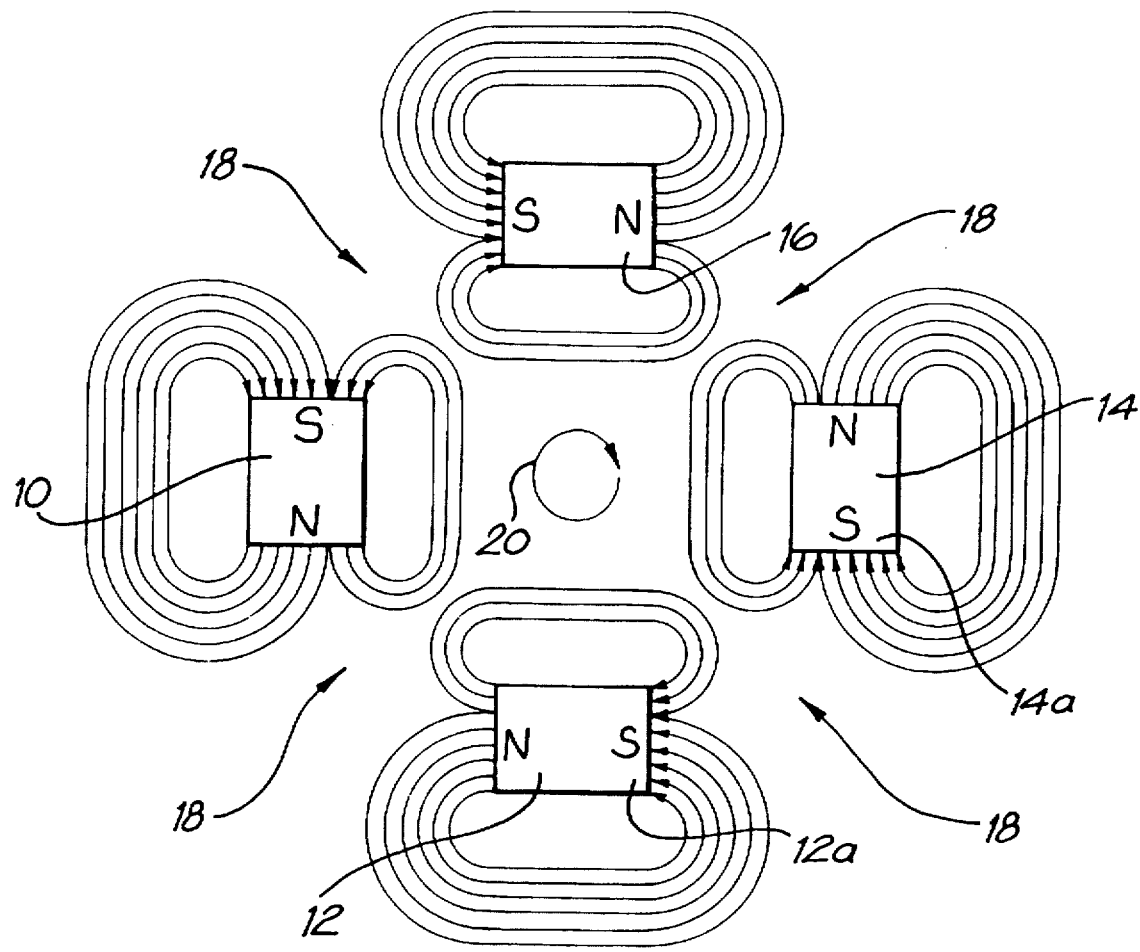
FIG. 7 shows a schematic illustrating a preferred arrangement of the permanent magnets according to the invention.

Referring to FIG. 7 the general preferred arrangement of the magnetic poles using permanent magnets is shown.

A number of permanent magnets 10, 12, 14 and 16 are arranged about an imaginary rotor at a given radius from the centre of rotation, the rotational motion of the rotor being indicated schematically by the arrow 20. The drawing shows four permanent magnets but the invention has application to any number of magnets arranged sequentially about the rotor. Preferably, as shown, the facing poles of adjacent magnets 10–16 are of the same polarity NNSSNNSS. For example, south pole 14a is adjacent the south pole 12a of the permanent magnet 12. Similarly for the other permanent magnets. For the arrangement illustrated four poles are thus provided (NN)(SS)(NN)(SS).

Alternatively, the permanent magnets may be arranged with their poles alternating NSNSNSNS (unlike poles opposed) about the rotor but this arrangement would be less efficient.

The arrangement of opposed magnetic poles creates a very strong magnetic flux in the gaps 18 between the permanent magnets 10–16. Thereby the flux available for interaction with the stator component of the motor or alternator is increased and in a motor this flux can provide a large torque and increased efficiency since the required driving current can be more efficiently matched.

Figure 1:
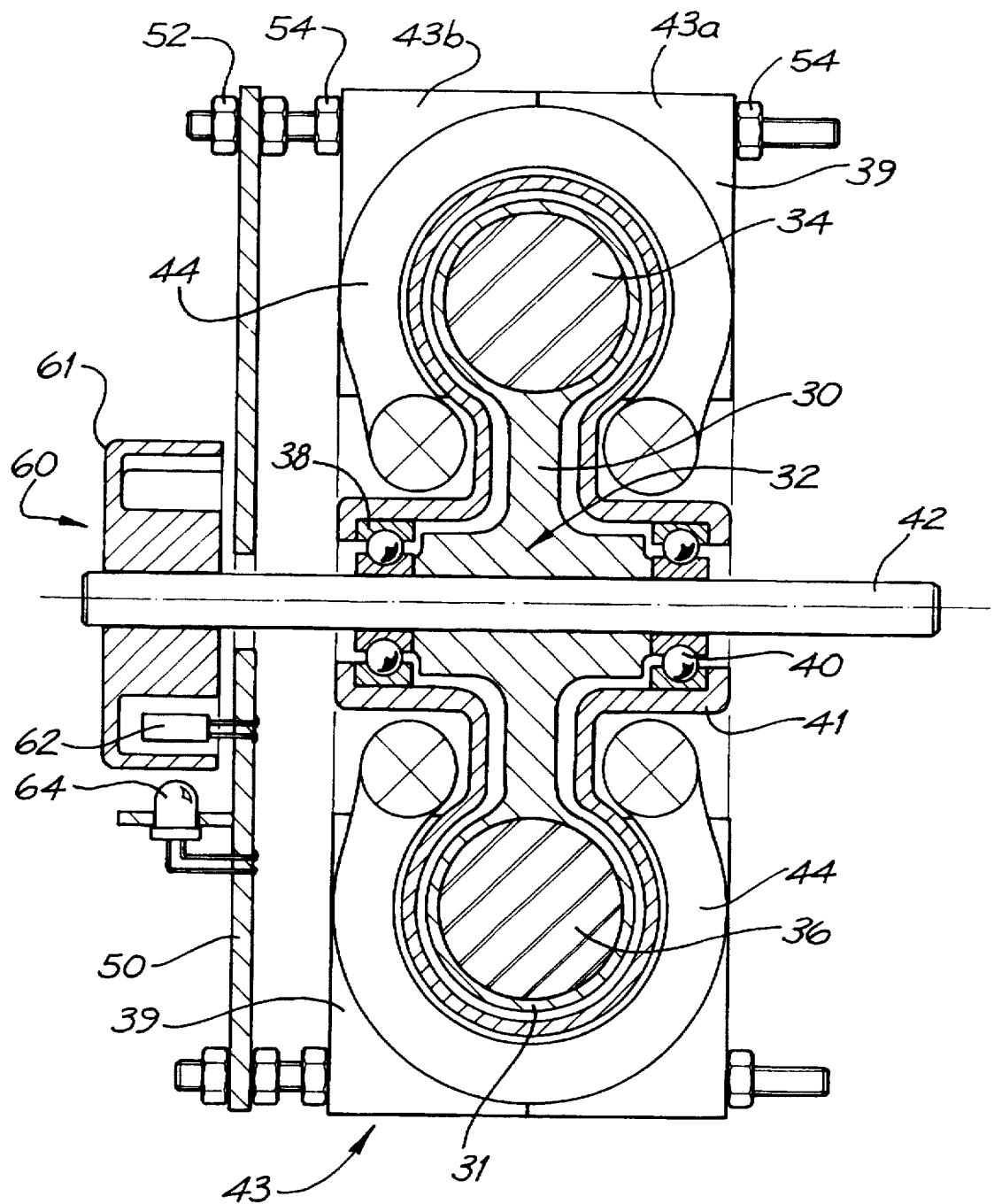
FIG. 1 shows a first embodiment of the invention.

FIG. 1 shows a first embodiment of the invention, in which the permanent magnets are arranged on a disc shaped rotor 30, having a central support area 32 with the permanent magnets 34,36 fixed tangentially to the circumference of the rotor 30. The rotor 30 is supported on bearings 38, 40 on shaft 42. The permanent magnets 34,36 are fixed to the rotor by being embedded in or surrounded by the material of the rotor, which is preferably a material having a low magnetic permeability, for example may be a plastics material or a metallic or electrically conductive material material (with a low magnetic permeability) such as aluminium or stainless steel.

3

Figure 1A:
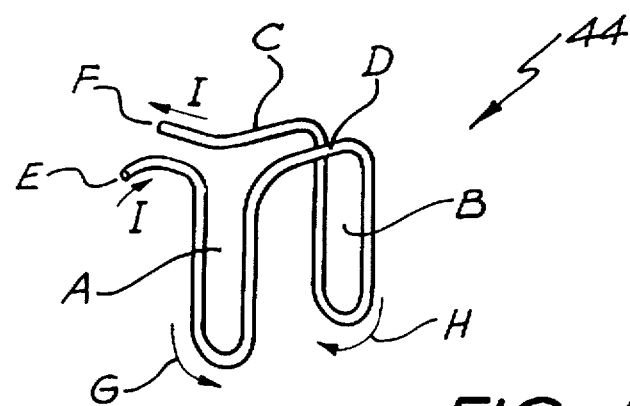
FIG. 1a shows the general form of a stator coil according to the invention.

The stator comprises coils 44 of a C-shape or a U-shape forming a toroidal shaped space within which the rotor magnets can rotate. The stator coils 44 are separated from the rotor by a housing 41 of non-magnetic material extending between the two bearings 38, 40. The stator coils 44 are made up of a number of windings which are each wound in the usual solenoidal form and pressed into the desired C-or U-shape, (as shown in FIG. 1a, for example) over a shaped former or in situ over stator housing 41. The coils 44 are placed between ribs or fins 39 formed as part of stator housing 41, the spacing of the ribs 39 being determined by the desired coil winding arrangement.

FIG. 1a shows the general form of a coil 44 where a single turn only is illustrated for simplicity, the shape of the coil corresponding to that about magnet 36 as shown in FIG. 1. The coil 44 when bent into its required shape forms a first half loop A joined to a second half loop B by links C and D. Current I enters and leaves the coil 44 by way of coil ends E and F. Current I moves in the direction of arrow G in the first half loop A and in the opposite sense, as shown by arrow H, in the second half loop B creating a very strong magnetic flux in the space between the half loops A and B, the space containing and traversed by the permanent magnets 34, 36. The links C, D do not contribute to the working flux and in addition are short, being situated on an inner radius of the stator, thereby providing a smaller coil resistance than in some other designs.

The number and arrangement of the windings will depend on the construction of the motor including the number of rotor poles and the number of phases to be employed. For example, each coil for a given phase may include a number of separate overlapping windings spaced along the stator housing at predetermined intervals (for example, being determined by or related to the spacing of the ribs 39) and joined to form a single coil. Each coil may further be made up as two separated, spaced halves, each in the manner as just described, and such as will be described below with respect to FIGS. 4–6 for a 4-pole, 3-phase motor.

Stator housing 41 may be made in two halves 43a,43b held together by nuts 54. The stator housing 41 is made of non-magnetic material, for example of a plastics material. External to the coils 44, an outer casing (not shown) may be included to enclose the coils 44. This may be made of a plastics material or may be made of a magnetic material, for example by being made of a ferrite impregnated plastics material or, if weight is not a disadvantage, of a soft iron laminate.

Alternatively, in place of an outer casing, a disc of magnetic material may be fixed to rotate with the shaft 42 on one or both sides of the stator housing 41 to provide magnetic shielding for components external to the motor or magnetic flux enhancement for the stator. By having the disc(s) rotating with the rotating magnetic field of the stator any eddy current or hysteresis losses in the magnetic material are reduced or avoided. Preferably, the outer casing material has a high electrical resistivity to reduce induced emfs.

The motor may be fixed to a support (not shown) by suitable support means such as nuts and bolts. Circuit board 50 carries the electronic components to control the electronic commutation of the stator coils. Attached to the circuit board 50 is the means, in this case a photoelectric sensor 62, for detecting the position of the rotor 30. The shutter housing 60 has a number of vanes 61 which as the housing 60 rotates on shaft 42 interrupt the light or radiation from source 64 falling on detector 62. This in turn is used to regulate the flow of current to the stator coils 44 in a manner well known in the art.

4

Other known methods for detecting the position of the rotor may be employed such as Hall effect sensors, or the like. Mechanical commutation may also be used employing slip rings and commutator segments to perform this function as well known in the art.

Figure 2:
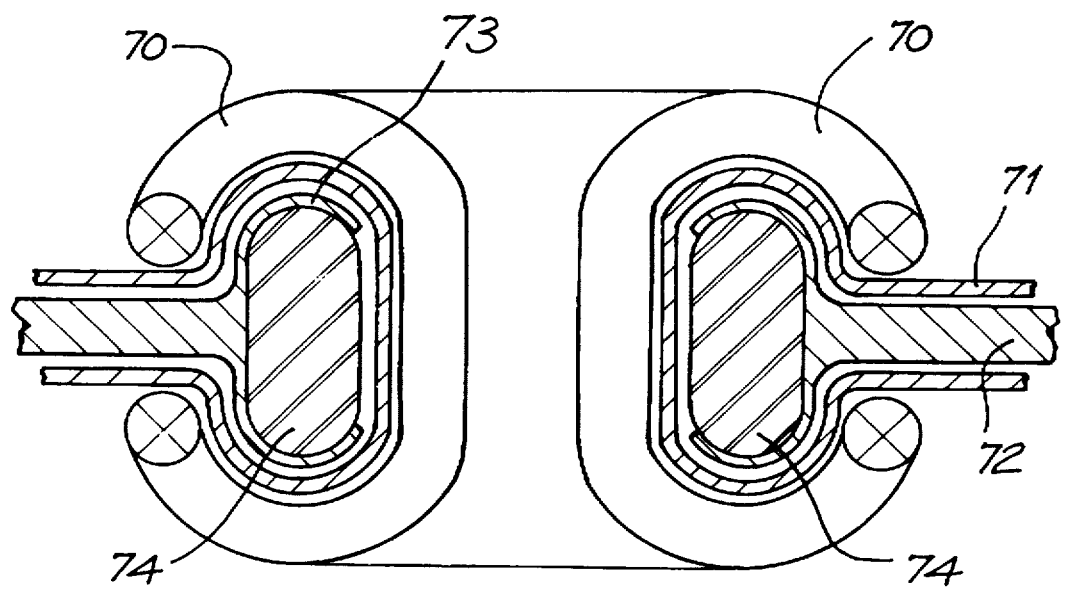
FIG. 2 shows a second embodiment of the invention.
Figure 3:
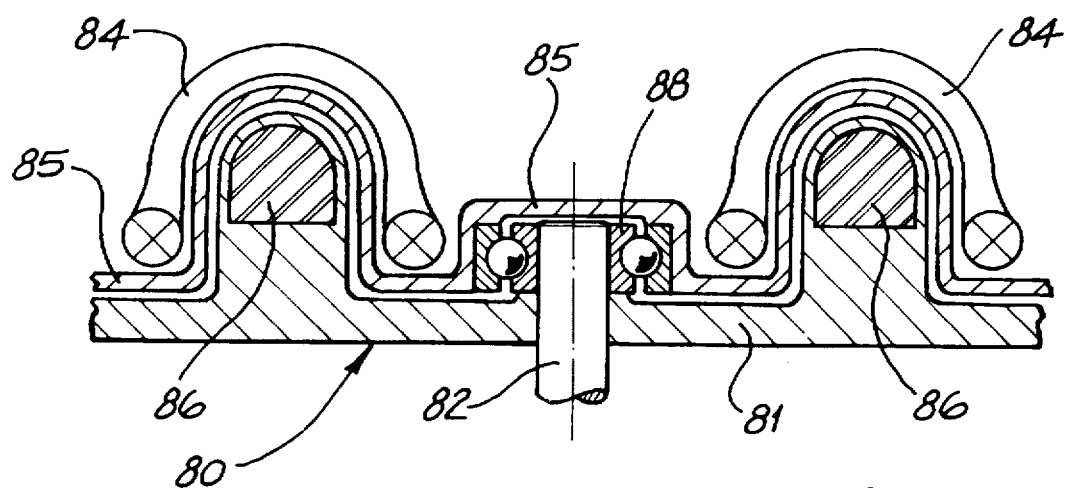
FIG. 3 shows a third embodiment of the invention.

FIGS. 2 and 3 show other embodiments of the invention. FIG. 2 shows a "reversed" geometry compared to that of FIG. 1, whereas FIG. 3 shows a "single" sided arrangement.

In FIG. 2 the stator coils 70 are formed to define a C-shaped space at the centre of the ring- or annulus-shaped rotor 72 enclosing the magnets 74 which are positioned on the inner radius of the rotor annulus. The rotor 72 may be supported in this arrangement by an air bearing, or a roller bearing fitted between the stator and rotor housings 71, 73.

In FIG. 3 rotor 80 spins on axle 82 supported from stator housing 85 on bearing 88 with the magnets 86 located to one side of the rotor disc 81. The magnets 86 need not, as shown in this embodiment, be at the periphery or an extremity of the rotor 80 as shown in the previous embodiments of FIGS. 1 or 2. The magnets 86 are surrounded by stator coils 84 in the manner as described above for the embodiment of FIG. 1. A double sided arrangement of the magnets 86 could also be used.

The operation of an embodiment of a 3-phase motor will now be described with respect to FIGS. 4–6, the motor having a 4-pole permanent magnet rotor (like poles opposed) and constructed according to the embodiment of FIG. 1.

In this arrangement there are three separate coil pairs 100,102; 112,114; 116,118, with each member, for example 100 and 102, of the pair spaced with their centres 180 mechanical degrees apart and with respective coils 100, 112, 116; or 102, 114, 116; centred 60 mechanical degrees apart about the circumference of the stator. Adjacent coils overlap in the sequence 100,112,116,102,114,118.

The position of the magnets of the rotor can be determined as described above using the interruption of a light source falling on a photoelectric detector but for this discussion it will be assumed that a Hall effect sensor, which detects the magnetic field exhibited by the permanent magnets, is used.

A similar 3-phase stator coil arrangement with a 4-pole rotor was described in the priority document PM0011 but employed half wave (uni-polar) excitation whereas the following description will refer to full wave (bi-polar) excitation.

Figure 5:
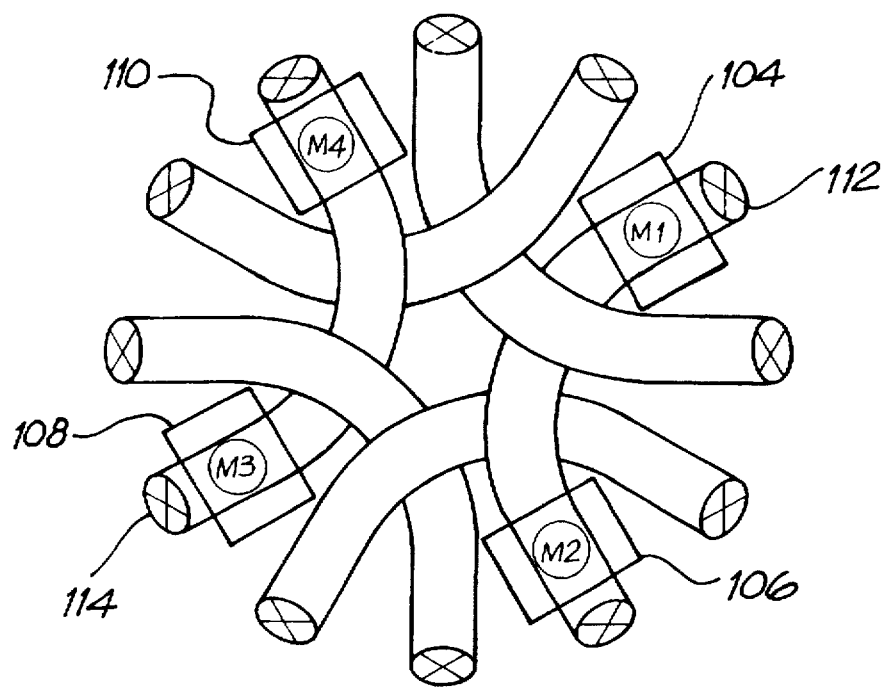
Figure 6:
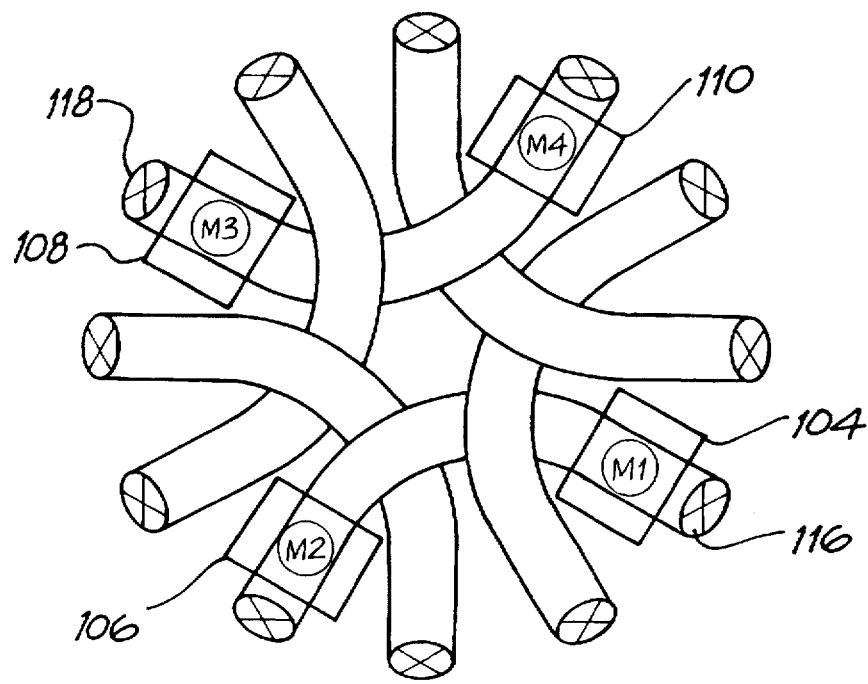

In the example of the invention described with respect to FIGS. 5–7 of the priority document PM0011 only one set of the coils, for example 100, 102, is activated at any one time, the other two of the set being switched off. Half wave excitation of such a motor activates a coil set for one third of the period T of the exciting wave form (a uni-polar square wave) and is OFF the remaining two thirds of the period with two such periods needed for a full revolution. In that embodiment as an active set is deactivated an adjacent set is turned on with the choice of the order in which the sets are turned on effecting clockwise or counter clockwise rotation of the rotor. The description of the priority document PM0011 is incorporated herein by reference.

Figure 4:
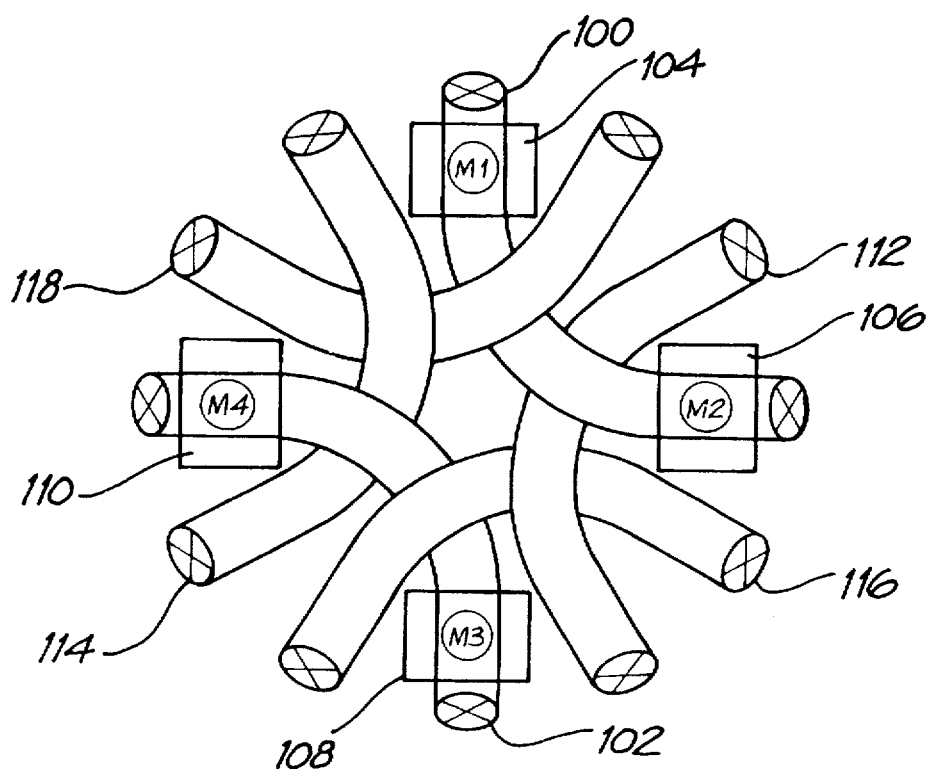
FIGS. 4-6 show schematically the operation of a three-phase, 4-pole motor according to the invention.
Figure 9:
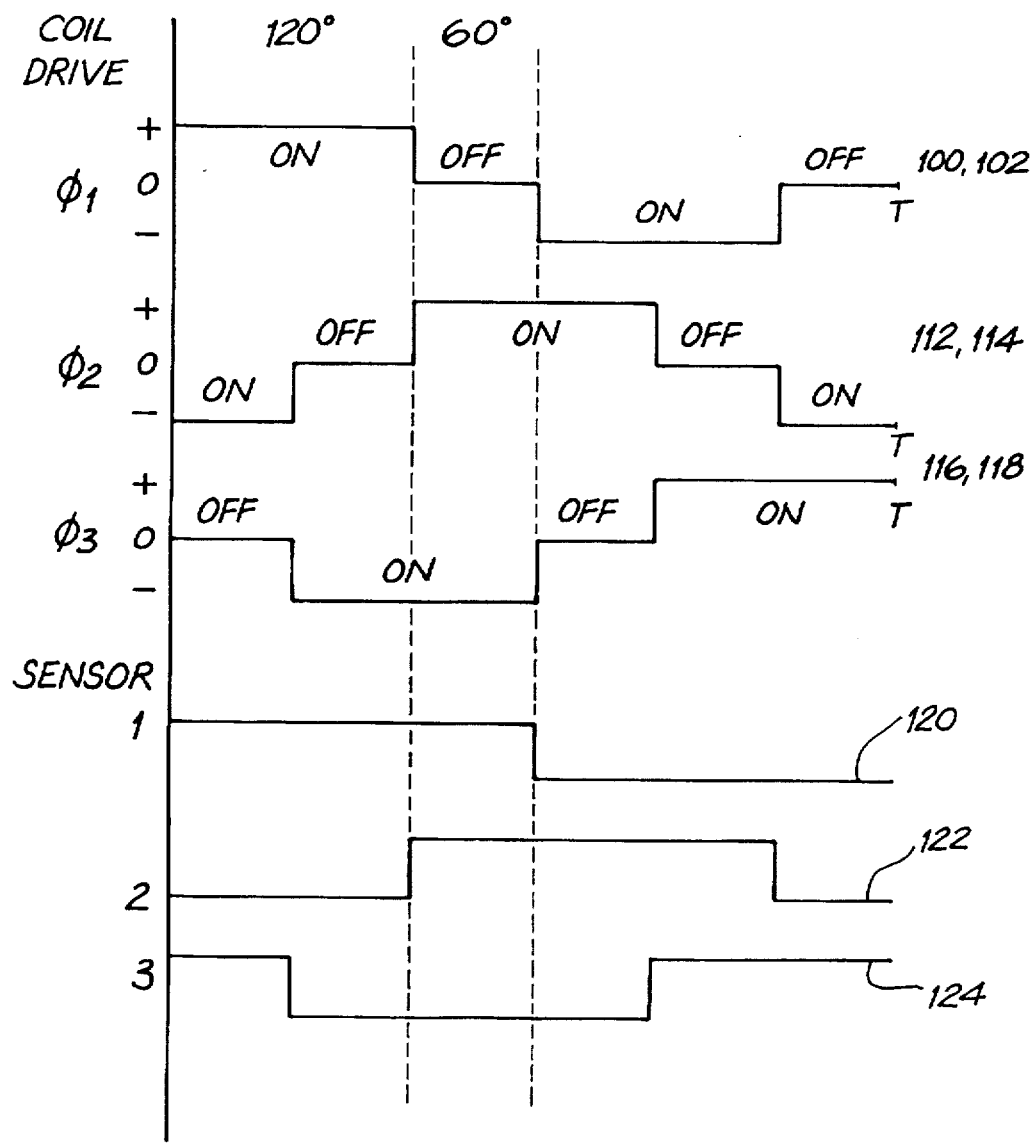
FIG. 9 shows coil excitation waveforms for the embodiment of FIGS. 4-6.

FIG. 9 shows suitable drive wave forms for driving the coil pairs 100,102; 112,114; 116,118, with a full wave excitation with the position of the magnets at three sequential stages shown in FIGS. 4–6.

The drive voltage wave form is a bi-polar square wave of period T, two periods being required to achieve a full 360 mechanical degrees rotation of the rotor for this embodiment. Each of the coil pairs 100,102; 112,114; 116,118 is excited for one third of period T with a positive square wave, is quiescent (OFF) for one sixth of period T then is excited for one third of period T with a negative square wave followed by a further quiesent (OFF) interval for one sixth of period T. The coil pairs 100,102; 112,114 116,118 are phased such that the start of the positive excursion for the pair is switched on the rising edge of the sensed output signal wave forms 120, 122, 124, thus for example 100,102 is switched on the rising edge of the sensed output signal of waveform 120. These signals 120,122,124 are the outputs from three Hall-effect sensors spaced 60° apart (thus covering a 120° arc of the rotor).

The three sequential stages shown in FIGS. 4–6 correspond to the magnet positions at one third intervals of the excitation period T starting in FIG. 4 with coil pair 100, 102 at the start of its excitation cycle. At this time coil pair 112, 114 is half way through its negative excursion while coil pair 116, 118 is in its first quiesent interval (after its positive excursion).

Activating the coils as described above achieves clockwise rotation viewed into the plane of the paper of FIGS. 4–6. Activation of the coils in the reverse sequence 100, 102 then 118, 116 then 112, 114 would achieve counter clockwise rotation.

The number of cycles needed to achieve a full 360 degrees movement of the rotor is a function of the number of magnets divided by two. Hence, an eight magnet (8-pole with like poles opposing) rotor would need four cycles per revolution and in turn would have approximately four times the starting torque of a two magnet rotor of this form.

The windings of the stator are formed around the magnets of the rotor and the flux generated is confined to the space essentially in which the magnets of the rotor spin thus contributing to the efficiency of the motor.

Figure 10:
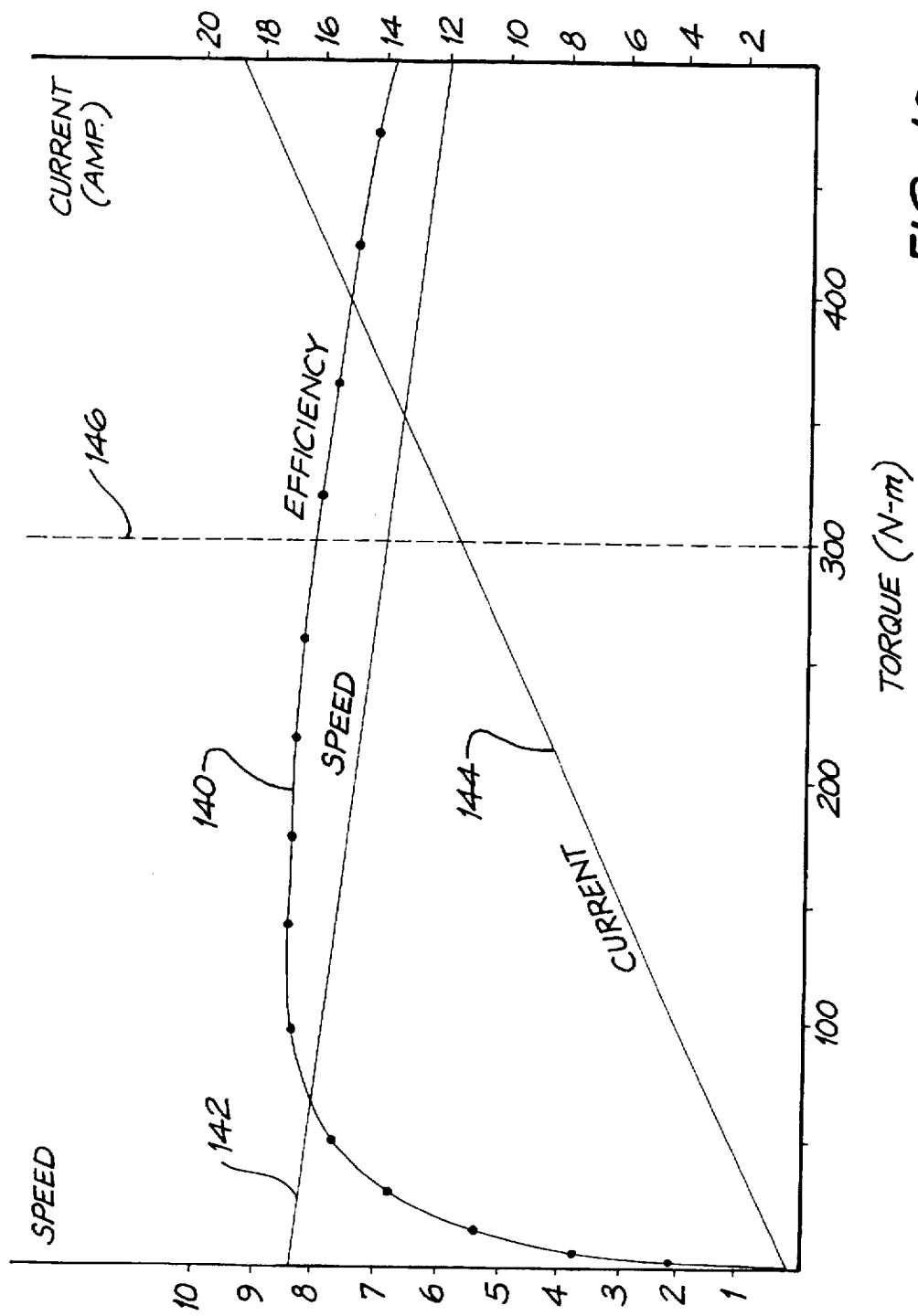
FIG. 10 shows the performance for a motor with an 8-pole rotor according to the invention and FIG. 11 shows a circuit diagram for electronically commutating the embodiment of FIGS. 4-6.

FIG. 10 shows the speed-torque relationship for an 8-pole, 3-phase motor embodiment similar to that of FIG. 1. The rotor has an outer diameter of 90 mm. with 8 neodymium magnets (like poles opposed) 12.7 mm. diameter and 12.7 mm. long spaced about the periphery. The stator coils are connected in a Y-(or star-)configuration each phase comprising 4 windings in parallel, each winding being 50 turns of 0.56 diameter wire. Speed and efficiency are displayed on the vertical axis while torque in Newton-metres is displayed along the horizontal axis. The curve showing the efficiency of the motor is identified by numeral 140 whereas the speed is identified by the curve 142. The efficiency curve 140 shows a relatively flat response over a wide torque range. The dotted line 146 corresponds to a continuous rating of 223 watts output at 7100 rpm and an efficiency of 82 per cent. The current-torque relationship is also shown on the graph as curve 144 with the current scale on the right hand vertical axis and the torque setting as before along the horizontal axis. The graphs were obtained for a motor operated at 24 volts peak to peak using a full wave drive.

The electronics for driving the switching of the wave forms to the various coils can be of any type well known to a person skilled in the art. In addition, it has been found that if Hall effect sensors are used they can be located externally of the stator coil for example in an embodiment of the type shown in FIG. 1. Thus it has been possible to detect the motion of the rotor magnets notwithstanding the presence of the magnetic field created by the current in the stator coils. This makes the placement of these sensors more convenient.

Figure 11:
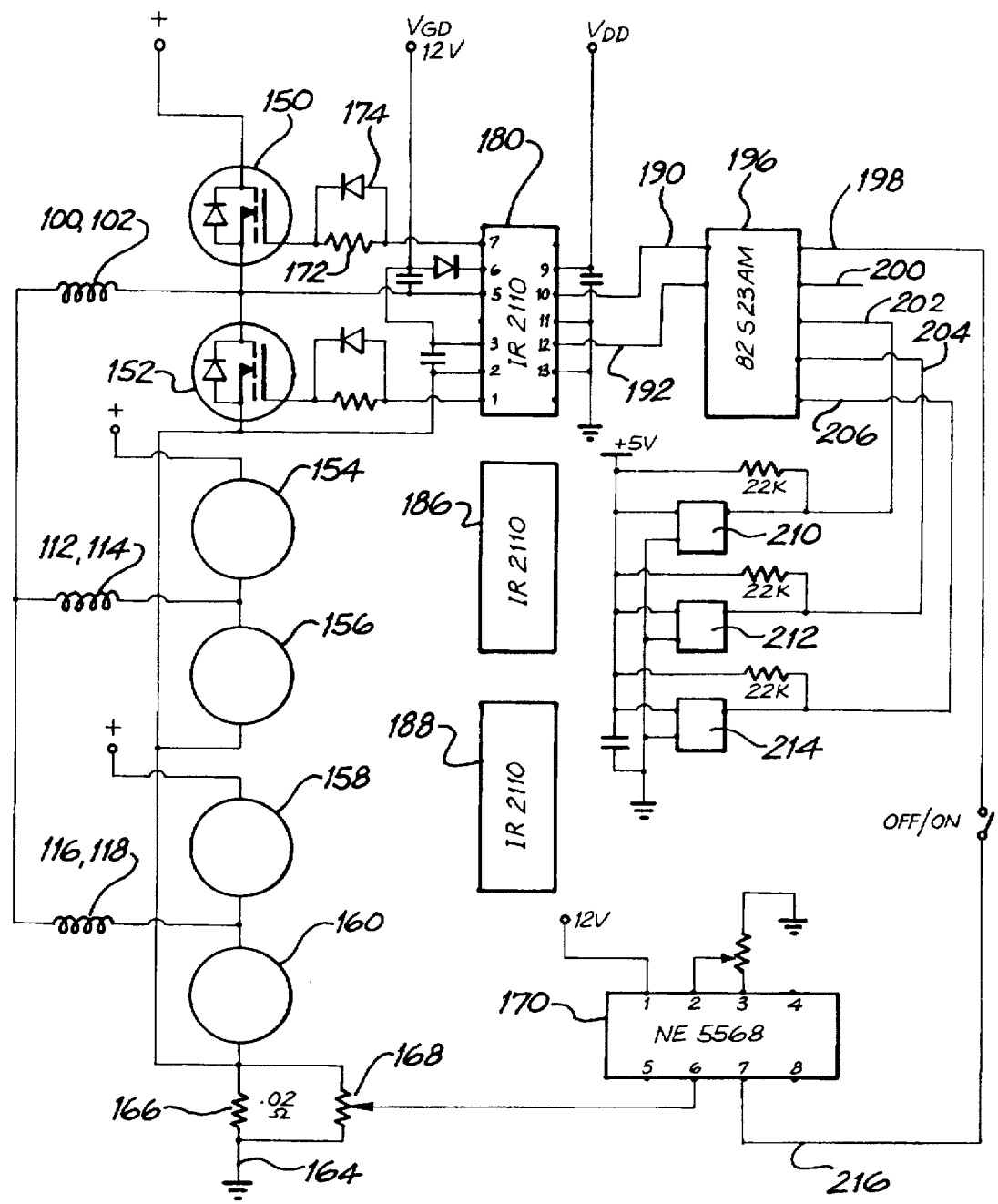

FIG. 11 shows a simple electronic commutation circuit employing Hall effect sensors to be used for switching the current to the various coils in an arrangement such as described with respect to FIGS. 4–6.

The embodiment of FIGS. 4–6 is a three phase motor and FIG. 11 shows a pulse width modulated three phase controller circuit where, for simplicity, only a single phase is fully illustrated.

Each pair of coils 100,102; 112,114; and 116,118 is driven from the common point of a high-low-FET pair 150,152; 154,156; and 158,160 respectively. Each pair of FETs is connected between the motor drive voltage 162 and ground 164 in series with a current sensing resistor 166 across which a variable resistance 168 is connected to provide a variable current sensing capability for feedback control to the pulse width modulation module 170.

The gate of each of the FET pair 150,152 is connected via a current limiting resistor 172 provided with reverse voltage diode protection 174 to the driver circuit 180, which can be any suitable driving circuit such as an International Rectifier IR2110 as shown. The common point 178 between the two FETs 150,152 is connected to the neutral or ground connection of the driver circuit 180. For the IR2110 the motor drive voltage is connected through pin 3 while a digital supply voltage Vdd is connected to pin 9, for example being a 5 volt TTL voltage. The motor drive voltage supplied is 12 volts.

The driver 180 has digital control inputs 190,192 supplied with signals from the decoder 196. The decoder is a read only memory device (ROM) such as type 82S23AM supplied by American Micro Devices. The decoder 196 activates the appropriate controller 180, 186 or 188 depending on the inputs 198, 200, 202, 204, 206. Inputs 202, 204 and 206 are the outputs (refer to FIG.9) of the Hall effect sensors 210,212,214 sensing the position of the magnets carried by the rotor of the motor. Input 198 corresponds to the motor drive voltage input which is also connected to a switch controlling on/off for the motor. Input 200 is an input allowing control of the direction of rotation of the motor by altering the address specified to ROM 196 to alter the sequence in which driver circuits 180, 186, and 188 are activated.

The pulse width modulation controller 170 such as a NE5568, has a power output 216 from Pin 7 of the device. The controller 170 is supplied with the analogue voltage (pin 1) and logic supply voltage (pin 7). The pulse width modulated output from the line 216 is connected to the on/off input line 198 of the decoder 196. The pulse width of the output voltage can be controlled through a suitable external variable resistance 218 as shown or may be controlled by feedback from the motor operating parameters. In the former case the speed of the motor can be manually controlled and in the latter case it can be automatically maintained at a prescribed value. The performance of the motor can also be controlled by the current sensing resistor 168 which can be adjusted to vary the maximum current peaks by varying the ON time of the motor drive voltage.

As the rotor rotates clockwise the magnets activate in sequence the sensors 210, 212 or 214 which in turn provide an input to the decoder 196. For the single phase shown activation of the sensor 210 will activate via the decoder 196 the line 190 and 192 of the driver circuit 180. Similarly as the magnets approach the sensor 212, the line 204 will go high while the line 202 will be low as will the line 206. The decoder 196 will therefore activate the address corresponding to the driver circuit 186. Similarly as the sensor 214 is approached the driver circuit 188 is activated.

Figure 8:
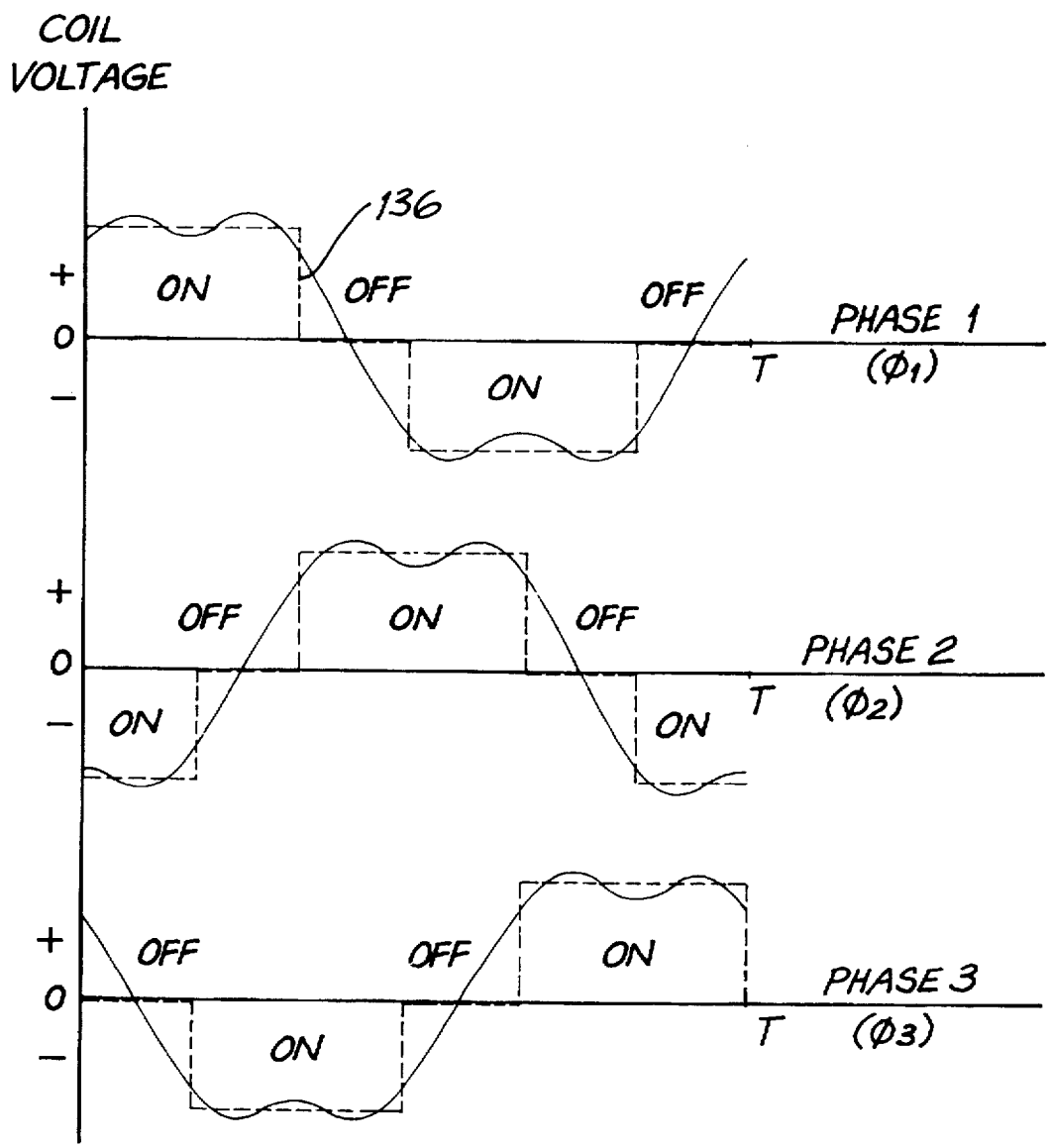
FIG. 8 shows the voltage output waveforms of a three-phase, 4-pole generator according to another embodiment of the invention.

When operated as a generator the 4-pole 3-phase device illustrated with respect to FIGS. 4–6 provides output wave forms 130,132,134 from the coils 100,102; 112,114 and 116,118 respectively as shown in FIG. 8. The wave forms 130, 132, 134 are phased 60 electrical degrees apart and are due to the construction of the rotor. To operate the device efficiently as a motor the current supplied to the coils should approximate the form shown in FIG.8. As can be seen by dotted line 136 each of the wave forms 130–134 approximates a square wave and hence the invention when operated as a motor operates efficiently with a square wave of driving voltage. The length of the permanent magnets and their spacing apart about the circumference of the rotor can be adjusted to optimise this performance.

Alternatively, in place of an electrically commutated control arrangement for the motor described above, a mechanical commutator can be employed. The commutator is fixed to and rotates with the rotor. A number of positive and negative segments are arranged about a cylindrical sleeve from which wires lead to the coils arranged about the circumference of the stator. A complimentary number of contacts are arranged about a cylinder radially inward of the commutator whereby rotation of the commutator selectively supplies voltages to the commutator segments and hence the coils of the stator. A mechanically commutated motor may provide a cheaper alternative to that of the electronically commutated motor described above.

The above embodiments principally describe motors and it is to be understood that the invention is equally applicable to the manufacture of generators or alternators mutatis mutandis.

In addition, the power and torque characteristics of the motor all depend upon the number of poles and the strength of the permanent magnets employed. For example, it is preferred that permanent magnets employing rare-earth elements such as samarium-cobalt or neodymium are to be used for the permanent magnets. It would also be possible to use ferrite magnets, superconducting magnets or electromagnets for the generation of the magnetic poles of the rotor typified by the use of permanent magnets in the above description. In the case where the magnetic field is generated by an electromagnet then the current to the coils would require some form of mechanical slip rings. Alnico permanent magnets may not be efficient since due to their low coercivity two opposed magnets (in the preferred arrangement with like poles opposed) when located at a close distance may weaken each other.

The rotor can be constructed as a moulding in which the permanent magnets are formed as a unit or as a pressed metal piece. Alternatively, the rotor may be made with fixtures to which the permanent magnets are secured by various techniques such as would be within the knowledge of a person skilled in the art.

Permanent magnet motors of the type described here will operate at a high rpm and will therefore be subject to high centrifugal forces necessitating that the permanent magnets be adequately secured to resist such forces. The rotor should be made of a non-magnetic material and it has also been found that conductive material such as aluminium or stainless steel does not adversely affect the operation of the motor. In the latter case as the material in the rotor is rotating at the same speed as the rotating magnetic field no eddy currents are induced in it. The rotor may also include magnetic material as pole pieces.

Though the invention has been described above with respect to preferred embodiments thereof it is contemplated that variations therein are possible within the knowledge of a person skilled in the art.

We claim:

1. An electromagnetic machine of the type having a stator and a rotor, said rotor having a plurality of magnets arranged about said rotor at a given radius with polar axes being tangential to a circumference of a circle defined by said radius and perpendicular to a rotational axis of said rotor and said stator being an arrangement of saddle-shaped solenoidally wound stator coils formed onto a non-magnetic stator housing in an open hollow toroidal configuration, open such that said magnets of said rotor are enclosed within a hollow toroidal space defined by said stator coils.

2. An electromagnetic machine as claimed in claim 1 wherein said open hollow toroidal configuration is of a C-shape or a U-shape in cross section encompassing said magnets of the rotor.

3. An electromagnetic machine as claimed in claim 2 wherein said magnets are formed by permanent magnets.

4. An electromagnetic machine as claimed in claim 3 wherein said magnets are formed from said permanent magnets having like poles opposed.

5. An electromagnetic machine as claimed in claim 4, wherein said rotor includes a rotor body made of non-magnetic material and said magnets are secured to said rotor body.

6. An electromagnetic machine as claimed in claim 5 wherein said rotor is of a discoid shape and said stator coil is arranged about the perimeter of said rotor, said permanent magnets being located along the circumference of the said rotor.

7. An electromagnetic machine as claimed in claim 5 wherein said rotor is of an annular form having a central hollow region with said permanent magnets being located about the edge of said hollow region and said stator coils are arranged about said permanent magnets at said edge.

8. An electromagnetic machine as claimed in claim 5 wherein said rotor is of a discoid shape with said permanent magnets being located at one side of said rotor with said stator coils being arranged about said permanent magnets.

9. An electromagnetic machine as claimed in claim 1 further including means to supply an excitation voltage to said stator coils in a predetermined sequence.

10. An electromagnetic machine as claimed in claim 9 wherein said means to supply excitation voltage to said stator coils includes a mechanical commutator.

11. An electromagnetic machine as claimed in claim 9 wherein said means to supply current to said stator coils includes circuit means to electronically commutate said excitation voltage to said stator coils and means to sense the position of the rotor to control the sequencing of the supply of said excitation voltage to said coils.

12. An electromagnetic machine as claimed in claim 11 further including a stator housing supporting said stator coils about said magnetic poles and made of a non-magnetic material.

13. An electromagnetic machine as claimed in claim 10 wherein said stator coils are supported on a stator housing made of a non-magnetic material.

14. An electromagnetic machine as claimed in claim 2 further including means to supply an excitation voltage to said stator coils in a predetermined sequence.

15. An electromagnetic machine as claimed in claim 3 further including means to supply an excitation voltage to said stator coils in a predetermined sequence.

16. An electromagnetic machine as claimed in claim 4 further including means to supply an excitation voltage to said stator coils in a predetermined sequence.

17. An electromagnetic machine as claimed in claim 5 further including means to supply an excitation voltage to said stator coils in a predetermined sequence.

18. An electromagnetic machine as claimed in claim 6 further including means to supply an excitation voltage to said stator coils in a predetermined sequence.

19. An electromagnetic machine as claimed in claim 7 further including means to supply an excitation voltage to said stator coils in a predetermined sequence.

20. An electromagnetic machine as claimed in claim 8 further including means to supply an excitation voltage to said stator coils in a predetermined sequence.

* * * * *